United States Patent [19]

MacKenzie, Jr.

[11] 4,005,254
[45] Jan. 25, 1977

[54] PRESSURELESS CURE SYSTEM FOR CHEMICALLY CROSS-LINKING ETHYLENE CONTAINING POLYMERS, AND PRODUCT FORMED THEREBY

[75] Inventor: Burton Thornley MacKenzie, Jr., Monroe, Conn.

[73] Assignee: General Electric Company, New York, N.Y.

[22] Filed: Nov. 5, 1975

[21] Appl. No.: 629,055

Related U.S. Application Data

[60] Division of Ser. No. 518,384, Oct. 29, 1974, Pat. No. 3,946,099, which is a division of Ser. No. 305,544, Nov. 10, 1972, Pat. No. 3,859,247, which is a continuation-in-part of Ser. No. 91,357, Nov. 20, 1970, abandoned, which is a continuation-in-part of Ser. No. 748,816, July 30, 1968, abandoned.

[52] U.S. Cl. .............. 174/110 PM; 260/37 SB; 260/42.15; 264/104; 428/328; 428/329; 428/405; 428/500
[51] Int. Cl.² ................... B32B 5/16; B32B 27/20
[58] Field of Search .......... 428/328, 329, 500, 405, 428/447; 260/37.5 B, 42.14, 42.15; 427/118; 174/110 PM, 118, 137 A, 110 SR; 264/104, 105, 174

[56] References Cited

UNITED STATES PATENTS

| | | | |
|---|---|---|---|
| 2,888,424 | 5/1959 | Precopio et al. | 174/110 PM |
| 3,160,598 | 12/1964 | Delfosse | 260/42.14 |
| 3,485,938 | 12/1969 | Kingsley | 427/118 |
| 3,534,132 | 10/1970 | Bailey et al. | 264/171 |

*Primary Examiner*—George F. Lesmes
*Assistant Examiner*—P. J. Thibodeau
*Attorney, Agent, or Firm*—R. G. Simkins; P. L. Schlamp; F. L. Neuhauser

[57] ABSTRACT

A curable composition comprising an ethylene-containing polymer, a curing agent, and a mineral filler treated with tetramethyltetravinylcyclotetrasiloxane, is compounded and fabricated to the desired shape, such as an insulation layer over a conductor. The fabricated product is then passed through a non-aqueous heat transfer medium maintained at about atmospheric pressure and at a temperature sufficient to effect curing in situ of the ethylene-containing polymer. The resulting cured composition is characterized as relatively dense (substantially non-porous) especially suitable for use as insulation for wire and cable.

2 Claims, 6 Drawing Figures

PRESSURELESS CURE SYSTEM FOR CHEMICALLY CROSS-LINKING ETHYLENE CONTAINING POLYMERS, AND PRODUCT FORMED THEREBY

This is a division of application Ser. No. 518,384, filed Oct. 29, 1974, now U.S. Pat. No. 3,946,099, issued Mar. 23, 1976, which in turn is a division of Ser. No. 305,544, filed Nov. 10, 1972, and now U.S. Pat. No. 3,859,247, issued Jan. 7, 1975, which is a continuation-in-part of Ser. No. 91,357, filed Nov. 20, 1970, and now abandoned, which in turn is a continuation-in-part of Ser. No. 748,816, filed July 30, 1968, and now abandoned.

Thermosetting or cross-linked polyethylene compositions are well known in the art and have been used extensively, especially for insulating materials for wire and cable. In the conventional manufacture of wire and cable employing such insulation materials, a filler, curing agent and other additives are admixed with the polyethylene, the compounded admixture is then fabricated over a metallic conductor as an insulation coating and then cured to form a thermosetting or cross-linked coating. Such compositions are used elsewhere but to a lesser extent such as in the manufacture of pipe and moldable products. Other olefinic compositions have been used in the same or similar manner, but polyethylene has been the most widely used polyolefin. The physical properties and performance characteristics of the cured composition depends primarily upon its application, and the compounding recipes and procedures are varied according to the properties required.

According to conventional practice, the polymeric compounds are cured at high temperature and pressures. In the manufacture of insulated wire and cable, for example, the fabricated article is passed from the extruder, where the curable composition is extruded over the conductor, to a steam curing chamber maintained at temperatures of about 388° to 406° F and correspondly under high pressures of about 200 to 250 psig, or more. The high temperature is required in order to decompose the curing agent and thereby promote cross-linking, and the high pressure is required in order to produce a relatively dense (non-porous) vulcanizate. Quite obviously, there are numerous cost and control problems associated with a high pressure, steam curing system.

This invention has therefore as among its objects to provide a method for chemically cross-linking a filled ethylene-containing composition which obviates the need of a high pressure curing system, and which results in a relatively dense and substantially non-porous, cured composition.

Although this invention is described hereinbelow with particular reference to compositions useful as insulation for wire and cable, it should be understood that the compositions may be used in other fabricated and moldable products. The terms "wire" and "cable", as used herein and in the appended claims, are employed as synonymous terms and refer to an insulated electrical conductor.

In accordance with the broadest aspect of this invention, there is provided a curable composition comprising (1) an ethylene-containing polymer, (2) a curing agent, and (3) a mineral filler treated with tetramethyltetravinylcyclotetrasiloxane (hereinafter sometimes referred to as simply vinyl siloxane). In preparing the composition, the polymer, filler, vinyl siloxane, and other additives are intimately admixed as in a Banbury. During this compounding operation, the vinyl siloxane interacts or coats the filler, and commonly this is referred to as siloxane treated filler. Where desired, the mineral filler may be pretreated with the vinyl siloxane in a separate operation, and the treated filler is then admixed with the polymer and other additives. A suitable curing agent, desirably a tertiary organic peroxide, is then incorporated into the admixture to effect substantially cross-linking of the polymer upon curing. The composition is extruded as an insulation layer over a conductor, and then passed through a non-aqueous heat transfer medium maintained at about atmospheric pressure and at a temperature sufficient to cure substantially in situ the ethylene-containing polymer. The cured product is characterized as relatively dense and therefore particularly useful as an insulation material, as described hereinafter in greater detail.

This invention will be further appreciated by reference to the accompanying figures, which illustrate in greater detail a preferred manner of carrying out the novel process for the manufacture of wire and cable.

Figure 1:
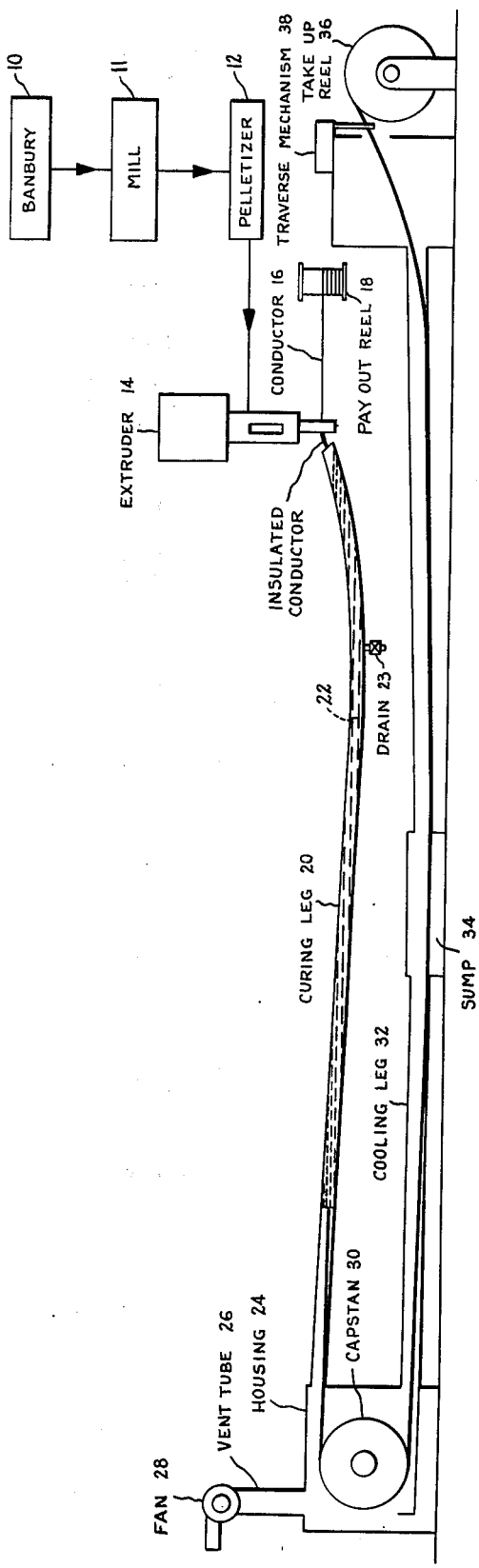
FIG. 1 is a diagrammatic view in elevation of the apparatus for carrying out the invention.

The insulation composition is compounded as in a Banbury indicated at 10, and then passed to a mill 11 to sheet the composition for subsequent handling. As a practical matter, the compound is hopper fed to an extruder, and therefore the sheeted composition is generally granulated or pelletized at 12 in preparation for use as extruder feedstock. As explained hereinafter in greater detail, the mineral filler may be pretreated with the vinyl silicone by intimately admixing the silane with the filler, and then adding the pretreated filler to the Banbury where the filler and vinyl siloxane interact. The compound is fed to a conventional wire extruder 14. A metallic conductor 16 is passed from a pay-out reel 18 through the extruder where the polymeric compound is extruded to form a coating of insulation over the conductor.

Upon emerging from the extruder, the insulated conductor 19 is passed through an elongated tube 20 containing a heat transfer medium 22, such as an organic fluid, and further may be provided with suitable valve and drain means 23. The heat transfer medium is maintained at an elevated temperature sufficient to effect substantial curing in situ of the polymer. Also, the heat transfer medium is not maintained under pressure, such as used with the conventional practice of curing under stream pressure, but rather is at atmospheric or ambient pressure. The temperature required will depend primarily upon such factors as the type of polymeric compound, the heat transfer medium and the curing agent employed. The length of tube 20 and the rate of travel through the tube should allow sufficient dwell time of product 19 in the heat transfer medium to effect substantial curing of the polymer, and may be determined readily by one skilled in the art. Tube 20 is heated as by an electric heating coil (not shown) or other suitable means. Also, it should be understood that other means for maintaining the curing bath, such as a vat or tank, may be substituted for the tube 20, but the tubular member provides a convenient and practical means for use in the manufacture of wire and cable requiring a minimum of apparatus and heat transfer medium.

Tube 20 terminates at housing 24 which preferably is vented to the atmosphere through vent tube 26 having an exhaust fan 28. Capstan 30 is maintained in housing 24, and the cable passing from the tube 20 is passed over the capstan and into an elongated cooling pipe 32, which is maintained at a temperature sufficiently low to cool the insulated conductor. Generally, it is sufficient to operate the cooling pipe at room temperature, and exhause fan 28 draws air through the pipe counter to the cable passing therethrough. Where desired, other means may be employed for cooling the cable. For example, the cooling pipe may be provided with a jacket and a refrigerant is passed through the jacket, or the cooling pipe may contain a fluid maintained at the desired low temperature. Here again, it should be understood that a vat or tank may be substituted for the cooling pipe 32. A sump 34 in cooling pipe 32 provides means for draining any fluids from the cable which may have been carried over from tube 20. The resulting product is then wound on take-up reel 36 provided with a traverse mechanism 38 to assure level winding of the cable.

As described above, the formed cable emerging from the extruder is passed through a heat transfer medium maintained at an elevated temperature sufficient to cure substantially the polymer. Also, the heat transfer medium is not maintained under pressure, such as with the conventional practice of curing under steam. It will be observed that the heat transfer medium must be substantially inert toward the polymer. Any of a number of heat transfer materials may be employed and these may include organic fluids, gases, molten salts, and salt solutions, and molten metalalloys. In the preferred embodiment of the invention, a polyalkylene glycol is employed, which may be either water soluble or water insoluble and have a viscosity range of from 50 to 90,000 Saybolt Universal Seconds at 100° F such as those sold under the tradename Ucon fluids. Other suitable organic fluids include, for example, glycerol and esters thereof, and propylene glycol and esters thereof. Also, suitable gaseous heat transfer materials include, for example, air, carbon dioxide, and nitrogen, which at the curing temperature is substantially free of water vapor and substantially inert to the polymer. The gaseous heat transfer medium, which may be preheated, is passed through the curing tube or chamber preferably countercurrent to the insulated conductor, and the curing is conducted at substantially atmospheric pressure.

In accordance with the invention, the curable composition comprises an ethylene-containing polymer, a curing agent, and a mineral filler treated with tetramethyltetravinylcyclotetrasiloxane. Also, certain additives are usually compounded with the polymeric blend. These compounding additives may include, for example, an antioxidant such as polymerized trimethyldihydroquinoline, a lubricant such as calcium stearate to prevent the composition from sticking during fabrication, a non-combustible additive such as antimony oxide and a halogenated compound to promote flame retardance, a coagent such as polybutadiene to facilitate cross-linking, and a small amount of pigment of coloring agent. The compounding agents required may vary considerably, and there may be others than those mentioned, depending upon the properties sought for the end product.

Where desired, polyethylene may be used alone or may be used in conjunction with one or more other polymers, but this will depend largely upon the requirements of the end product. The ethylene-containing member may be polyethylene, which may be blended with other polymers, and copolymers of ethylene or other polymerizable materials. Suitable copolymers of ethylene include, for example, ethylene-propylene rubber, ethylene-propylene terpolymer, and ethylene-vinyl acetate. The amount of ethylene used in the copolymer will alter the properties of the end product, and therefore may be varied to achieve the required results. For example, a typical copolymer of ethylene and propylene comprises about 50 mole percent of each component, and a copolymer of ethylenevinyl acetate typically comprises about 72 to 95 percent by weight ethylene and the balance being vinyl acetate.

The polyethylene or copolymer of ethylene may be blended with a chlorine-containing polymer, such as chlorinated polyethylene, chloro-sulfonated polyethylene, and polyvinyl chloride, to promote flame retardance of the composition. It is known that the flame retardant properties of polyethylene compositions may be enhanced by using a chlorine-containing polymer, and the compositions may contain up to about 15 percent by weight chlorine based on the total weight of all polymers present. A higher chlorine content can adversely affect the composition by resulting in a porous product. The chlorine-containing polymer is relatively more expensive than the polyethylene, and therefore, it is desirable to use the minimum chlorine content which will provide sufficient flame retardance to enable the cured composition to pass the flame test specified by the product requirements. The tensile strength of the final product generally is increased with an increased proportion of the unchlorinated polymer or copolymer, but at least a minimum content of about 2 percent by weight chlorine of the total polymeric components is used to impart the desired flame retardance property to the product. Thus, the proportions for the ingredients may be varied within the specified limits to meet the mechanical properties and performance characteristics desired for an insulation composition.

A suitable mineral filler is compounded with the insulation composition which provides the composition with sufficient strength necessary for fabricating the cable so that it will retain its structure during fabrication. The mineral fillers utilized in the composition may be any of those commonly employed in polymeric compositions and include, for example, aluminum silicate, aluminum oxide, calcium silicate, silica, magnesium silicate, titanium dioxide, and mixtures thereof. The filler may contain certain inert impurities, typically metallic oxides, which may range up to about 5 percent by weight of the filler. These filler materials are well known and readily available on the market, and the type of filler used will depend largely on the desired properties for the end product and may be determined by one skilled in the art. The titanium dioxide filler typically possesses a particle size of about 0.2 to 0.4 microns (mean diameter) and a specific gravity of about 3.9 to 4.1. The other filler materials typically are calcined to reduce the moisture content to less than 0.5 percent by weight, and generally possess a particle size of the order of 2 microns diameter and a specific gravity of about 2.5 to 2.8. However, also applicable is a magnesium silicate filler having a plate-like structure, a particle size not greater than 6 microns, and desirably a specific surface area of 18 to 20 square meters per gram as determined by BET Gas Absorption Method, and a specific gravity of about 2.7 to 2.8. This magnesium silicate filler is sold by Sierra Talc Company under the tradename Mistron Vapor Talc.

The function of fillers in polymeric insulation compositions is well known, and the amount of filler incorporated into the composition may be varied depending upon the properties desired in the cured product. The filler content may range from about 25 to 60 percent by weight of the composition, and more preferably about 30 to 50 percent by weight. The filler is treated with about 0.15 to 4 percent by weight of tetramethyltetravinylcyclotetrasiloxane, and preferably 0.5 to 3 percent. An excess of vinyl siloxane apparently acts like a plasticizer, which consequently appears to degrade the tensile strength and electrical properties of the cured composition, and further results in a porous product, and therefore is avoided.

The compounding operation is conducted within a temperature range high enough to render the admixture sufficiently plastic to work, but below the reacting temperature or decomposition temperature of the curing agent so that the curing agent will not decompose thereby causing at least partial or incipient curing of the polyethylene stock during the normal mixing cycle. Desirably, the curing agent employed in the operation is an organic peroxide, such as a tertiary peroxide, and characterized by at least one unit of the structure

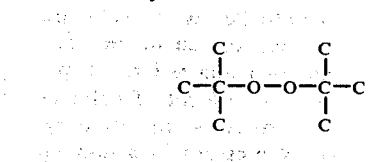

which decomposes at a temperature in excess of about 275° F. The use of these peroxide curing agents in effecting cross-linking of polymers such as polyethylene compounds is adequately described in U.S. Pat. Nos. 3,079,370, 2,888,424, 3,086,966 and 3,214,422, which patents are incorporated in this specification by reference. The most commonly used peroxide curing agent, and the agent preferred, is di-α-cumyl peroxide. Other useful curing agents include the tertiary diperoxides such as 2,5-dimethyl-2,5(t-butyl peroxy) hexane and 2,5-dimethyl-2,5(t-butyl peroxy) hexyne-3, and the like diperoxy compounds.

The proportion of peroxide curing agent used depends largely on the mechanical properties sought in the cured product, for example, hot tensile strength. A range of from about 0.5 to 10 parts by weight of peroxide per hundred parts of polymer satisfies most requirements, and the usual proportion is of the order of 2 to 4 parts peroxide. In a typical production operation employing a tertiary peroxide as a curing agent, compounding is conducted at a temperature of from about 200° to 275° F. If compounding is conducted at a temperature much higher than the stated maximum, the peroxide will decompose thereby causing premature curing of at least a portion of the polymer. As a consequence, the compound will be difficult to fabricate and the final product will exhibit an irregular or roughened surface.

In addition to effecting substantial economies by obviating the need of a high pressure curing system, a further distinct advantage is that the invention makes it feasible to manufacture cable having a sodium conductor insulated with a chemically cross-linked polyolefin. A cable of this type, and its method of manufacture, is disclosed and claimed in U.s. Pat. No. 3,534,132 to Carl A. Bailey and Raymond E. Isaacson, and assigned to the assignee of this invention. It is apparent that such a cable could not be cured under steam pressure because working with sodium in a water and/or water vapor environment is extremely hazardous. Moreover, sodium is liquid at the temperatures employed in the manufacture and cure of cable, and because the insulation layer is in a plastic state when it is passed from the extruder to the curing oven, the high pressures employed in the curing oven would compress the walls of the cable and squeeze the sodium out from its insulation jacket. It will be observed that the insulated sodium cable can be made by the process of my invention in that a water environment is eliminated and that curing is conducted in the absence of pressure.

In a still further modification, the curable composition of this invention may be subjected to a vacuum prior to the curing operation. For example, the extruder may be vented and a vacuum drawn on the barrell of the extruder as the composition is fluxed or plasticized and advanced through the barrell by the extruder screw. Where desired, the composition may be fed to the extruder from a hopper maintained under a vacuum. Performing the operation under vacuum may be particularly advantageous in assuring a relatively dense product.

The following examples further illustrate the invention.

EXAMPLES 1-5

In Examples 1 through 5, the compositions were prepared by conventional compounding technique according to the recipes shown in Table I. The filler and vinyl siloxane were added separately in the compounding operation. Example 1 was a control sample for the mineral filler was not treated with vinyl siloxane. The amounts in the table for each component are parts by weight. The compounds were then formed into slabs measuring 4½ inches square and having a thickness of about 75 mils. The slabs were cured by immersion for 2 minutes in a polyalkylene glycol sold under the tradenamr Ucon LB-300X having a viscosity in Saybolt Universal Seconds of 300 and maintained at a temperature of 200° C. The cured products were tested for degree of cure by toluene extract wherein a 2 gram sample is extracted by boilng toluene for 16 hours substantially in accordance with the test described by ASTM D-297.

TABLE I

| Examples | Recipes and Toluene Extracts | | | | |
|---|---|---|---|---|---|
| | 1 | 2 | 3 | 4 | 5 |
| Polyethylene | 100 | 100 | 100 | | |
| Ethylene-vinyl acetate copolymer (6% by weight vinyl acetate) | | | | | 100 |

TABLE I-continued

| Examples | Recipes and Toluene Extracts | | | | |
| --- | --- | --- | --- | --- | --- |
| | 1 | 2 | 3 | 4 | 5 |
| Ethylene-propylene copolymer (50 mole % ethylene) | | | | | 100 |
| Aluminum silicate | 50 | 50 | | | 120 |
| Precipitated hydrated silica | | | | 50 | |
| Mistron Vapor Talc (magnesium silicate) | | | 50 | | |
| Vinyl siloxane | | 1.5 | 1.5 | 1.5 | 1.5 |
| Di-α-cumyl peroxide | 3.5 | 3.5 | 3.5 | 3.5 | 3.5 |
| Toluene Extract (% on compound) | 11.6 | 9.6 | 11.8 | 10.5 | 7.3 |

Figure 2:
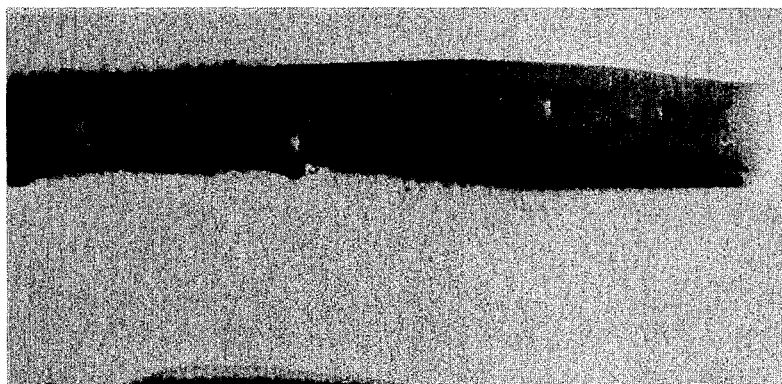
FIGS. 2–6 are photomicrographs, at a magnification of seven diameters, of typical sections of cured compositions prepared as described in the examples below.
Figure 3:
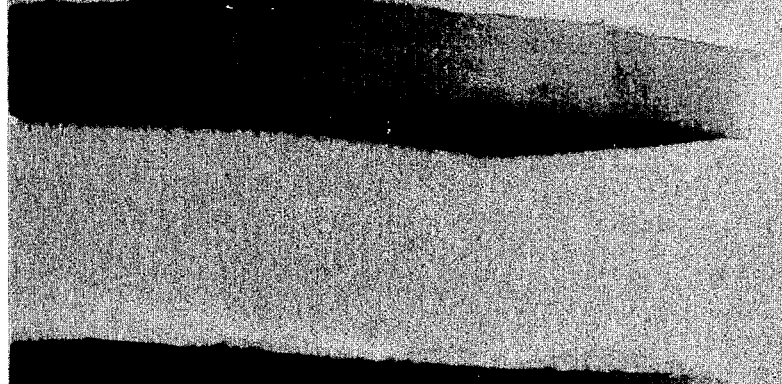
Figure 4:
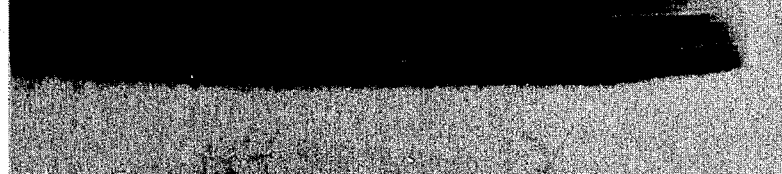
Figure 5:
Figure 6:

The toluene extracts show that the polymer was cured to a relatively high degree which compares favorably with the conventional steam curing process which typically has a toluene extract ranging from about 6 to 15 percent. All of the sample runs were visually examined for porosity. Example 1, the control, was relatively porous and therefore not acceptable as insulation for wire and cable. The remaining examples exhibited little or no porosity and therefore are acceptable for use as an insulation. This is clearly illustrated in FIGS. 2 through 6 which are photomicrographs of Examples 1 through 5.

It will be observed from the preceding description and examples that by reason of my invention, a high pressure curing system is eliminated, and a relatively dense and non-porous product is obtained which is particularly useful as insulation for wire and cable.

What I claim as new and desire to secure by Letters Patent of the United States is:

1. An electrical cable with a relatively dense and substantially non-porous cured insulation composition comprising a conductor and a layer of insulation overlying said conductor, said cured insulation composition comprising the cured product of; (a) an ethylene containing polymer, (b) a curing agent, and (c) a mineral filler treated with about 0.15 to 4.0 percent of tetramethyltetravinylcyclotetrasiloxane by weight of the filler, and which has been cured by heating at about atmospheric pressure in an non-aqueous heat transfer medium to a temperature and for a dwell time sufficient to cure substantially in situ the ethylene containing polymer to relatively dense and substantially non-porous cured filled polymer insulation composition about the conductor.

2. An electrical cable with a relatively dense and substantially non-porous cured insulation composition comprising a conductor and a layer of insulation overlying said conductor, said insulation composition comprising the cured product of: (a) an ethylene containing polymer selected from the group consisting of polyethylene, copolymers of ethylene and propylene, and copolymers of ethylene and vinyl acetate, and mixtures thereof; about 25 to 60 percent by weight of the composition of a mineral filler selected from the group consisting of aluminum silicate, calcium silicate, magnesium silicate, silica, aluminum oxide, and titanium dioxide, and mixtures thereof treated with about 0.15 to 4.0 percent of tetramethyltetravinylcyclotetrasiloxane by weight of the filler; and an organic peroxide curing agent in amount of about 0.5 to 10 parts by weight per hundred parts by weight of polymer; and which composition has been cross-link cured by heating at about atmospheric pressure in a non-aqueous heat transfer medium to a temperature and for a dwell time sufficient to cure substantially in situ the ethylene containing polymer to a relatively dense and substantially non-porous cured filled polymer insulation composition about the conductor.

* * * * *